(12) United States Patent
Liu et al.

(10) Patent No.: US 9,607,396 B2
(45) Date of Patent: Mar. 28, 2017

(54) METHOD AND DEVICE FOR DISCRIMINATING A BOUNDARY OF IMAGE, AND DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Peng Liu, Beijing (CN); Xue Dong, Beijing (CN); Renwei Guo, Beijing (CN); Kai Yang, Beijing (CN)

(73) Assignees: BOE TECHNOLOGY GROUP CO., LTD., Beijing (CN); BEIJING BOE OPTOELECTRONICS TECHNOLOGY, CO., LTD., Beijing (CN)

( * ) Notice: Subject to any disclaimer, the term of this patent is extended or adjusted under 35 U.S.C. 154(b) by 25 days.

(21) Appl. No.: 14/771,110

(22) PCT Filed: Dec. 3, 2014

(86) PCT No.: PCT/CN2014/092864
§ 371 (c)(1),
(2) Date: Aug. 27, 2015

(87) PCT Pub. No.: WO2016/026238
PCT Pub. Date: Feb. 25, 2016

(65) Prior Publication Data
US 2016/0371848 A1    Dec. 22, 2016

(30) Foreign Application Priority Data

Aug. 21, 2014 (CN) .......................... 2014 1 0415432

(51) Int. Cl.
*G06K 9/00* (2006.01)
*G06T 7/00* (2017.01)
(Continued)

(52) U.S. Cl.
CPC ............ *G06T 7/0083* (2013.01); *G06T 7/408* (2013.01); *G09G 5/02* (2013.01); *G06T 2207/10024* (2013.01); *G06T 2207/20004* (2013.01)

(58) Field of Classification Search
None
See application file for complete search history.

(56) References Cited

U.S. PATENT DOCUMENTS 6,674,905 B1    1/2004  Matsugu et al.
8,675,970 B2 *  3/2014  Fukushi ............... G06K 9/0014
                                                          382/118
(Continued)

FOREIGN PATENT DOCUMENTS

CN          101286233 A         10/2008
CN          101340577 A         1/2009
(Continued)

OTHER PUBLICATIONS

International Search Report mailed Jan. 6, 2015; PCT/CN2014/092864.
(Continued)

*Primary Examiner* — Feng Niu
(74) *Attorney, Agent, or Firm* — Ladas & Parry LLP

(57) ABSTRACT

Disclosed are a method and a device for discriminating a boundary of image, and a display panel, for effectively discriminating whether an image has a boundary and in which direction the boundary is. The method for discriminating the boundary of image comprises: receiving an image information to be discriminated to form a matrix of grayscale parameter values, and dividing, with a grayscale
(Continued)

| $Y_{1,1}$ | $Y_{1,2}$ | $Y_{1,3}$ | $Y_{1,4}$ | $Y_{1,5}$ |
|---|---|---|---|---|
| $Y_{2,1}$ | $Y_{2,2}$ | $Y_{2,3}$ | $Y_{2,4}$ | $Y_{2,5}$ |
| $Y_{3,1}$ | $Y_{3,2}$ | $Y_{3,3}$ | $Y_{3,4}$ | $Y_{3,5}$ |
| $Y_{4,1}$ | $Y_{4,2}$ | $Y_{4,3}$ | $Y_{4,4}$ | $Y_{4,5}$ |
| $Y_{5,1}$ | $Y_{5,2}$ | $Y_{5,3}$ | $Y_{5,4}$ | $Y_{5,5}$ | parameter value corresponding to a sub-image unit to be processed as a center, the matrix of grayscale parameter values into a n×n matrix and a (n+2)×(n+2) matrix (S101); determining respectively in the n×n matrix and the (n+2)×(n+2) matrix: a minimum gradient and a minimum standard deviation in a row direction, in a column direction, in a first diagonal direction, and in a second diagonal direction, dispersion with respect to the minimum standard deviation and dispersion with respect to the minimum gradient (S102; S103); outputting a first code value when the determined dispersion is greater than N multiples of a minimum corresponding thereto, outputting a second code value when the determined dispersion is smaller than the N multiples of the minimum corresponding thereto (S104); determining, based on an outputted code value, whether the image to be discriminated has a boundary and in which direction the boundary is (S105).

12 Claims, 3 Drawing Sheets

(51) Int. Cl.
*G09G 5/02* (2006.01)
*G06T 7/40* (2017.01)

(56) References Cited

U.S. PATENT DOCUMENTS

| | | | |
|---|---|---|---|
| 8,948,474 B2 * | 2/2015 | Chang | G06T 7/0012 382/128 |
| 9,177,365 B2 * | 11/2015 | Lim | G06T 5/002 |
| 2005/0002570 A1 * | 1/2005 | Clark | G06K 9/4609 382/199 |
| 2009/0060375 A1 | 3/2009 | Lim et al. | |
| 2011/0317924 A1 | 12/2011 | Fukushi et al. | |
| 2013/0223761 A1 | 8/2013 | Chang et al. | |

FOREIGN PATENT DOCUMENTS

| | | |
|---|---|---|
| CN | 101378508 A | 3/2009 |
| CN | 102129681 A | 7/2011 |
| CN | 102289825 A | 12/2011 |
| CN | 102393959 A | 3/2012 |
| CN | 103606163 A | 2/2014 |
| CN | 103839247 A | 6/2014 |
| JP | 2004-242836 A | 9/2004 |

OTHER PUBLICATIONS

Written Opinion of the International Searching Authority mailed Jun. 1, 2015; PCT/CN2014/092864.
Wafa Barkhoda, et al; "Fuzzy Edge Detection Based on Pixel's Gradient and Standard Deviation Values", Proceedings of the International Multiconference on Computer Science and Information Technology, pp. 7-10; Date of Conference: Oct. 12-14, 2009.
Sun Wei, et al; "Fuzzy edge detection based on standard deviation gradient", Jul. 2005, 5 pages; No. 14 Institute of China Electronics Technology Group Corporation.
First Chinese Office Action Appln. No. 201410415432.9; Dated Mar. 3, 2015.

* cited by examiner

| $Y_{1,1}$ | $Y_{1,2}$ | $Y_{1,3}$ | $Y_{1,4}$ | $Y_{1,5}$ |
|---|---|---|---|---|
| $Y_{2,1}$ | $Y_{2,2}$ | $Y_{2,3}$ | $Y_{2,4}$ | $Y_{2,5}$ |
| $Y_{3,1}$ | $Y_{3,2}$ | $Y_{3,3}$ | $Y_{3,4}$ | $Y_{3,5}$ |
| $Y_{4,1}$ | $Y_{4,2}$ | $Y_{4,3}$ | $Y_{4,4}$ | $Y_{4,5}$ |
| $Y_{5,1}$ | $Y_{5,2}$ | $Y_{5,3}$ | $Y_{5,4}$ | $Y_{5,5}$ |

FIG. 2

| 71 | 90 | 195 | 69 | 225 |
|---|---|---|---|---|
| 89 | 242 | 118 | 161 | 24 |
| 177 | 101 | 238 | 95 | 56 |
| 234 | 36 | 221 | 250 | 162 |
| 179 | 168 | 175 | 106 | 18 |

FIG. 3

|     |     |     |     |     |
|-----|-----|-----|-----|-----|
| 77  | 210 | 241 | 250 | 111 |
| 4   | 245 | 227 | 68  | 24  |
| 45  | 174 | 73  | 185 | 187 |
| 69  | 74  | 251 | 46  | 113 |
| 71  | 209 | 114 | 251 | 72  |

METHOD AND DEVICE FOR DISCRIMINATING A BOUNDARY OF IMAGE, AND DISPLAY PANEL

TECHNICAL FIELD

The present disclosure relates to the field of display technique, and more particularly, to a method for discriminating a boundary of image, a device for discriminating a boundary of image, and a display panel.

BACKGROUND

Virtual algorithm is a new image processing measure. With regard to a particular sub-pixel arrangement, virtual algorithm can improve a lower physical resolution to a higher virtual resolution, optimize display effect, and enhance visual experience of human eyes.

Virtual algorithm usually adopts filters to process input signals, the input signals are re-sampled by the filters for allocation, thus realizing virtual display. But the filters in virtual algorithm can not accurately process different types of image, for example, color edge may appear in some filters in a case of a slant pattern, this phenomenon is typically called as color aliasing. In order to reduce color aliasing effect, on one hand, it needs to constantly test and feed back, optimize the filters, thus improving display effect; on the other hand, it needs to adopt different filters to process a different type of image or a different location on the same image. For example, usually, a universal filter is adopted for a location having no boundary, and a boundary filter is adopted for a location having a boundary.

To implement filtering in different situations, it needs to process luminance signals of input data, design discriminating process, identify sharp boundaries therein, classify specific horizontal line, vertical line, left diagonal line, and right diagonal line, thereby adopting different filters.

Therefore, how to effectively discriminate a boundary of an image is a technical problem that needs to be immediately solved by those skilled in the art.

SUMMARY

In view of the above, embodiments of the present disclosure disclose a method for discriminating a boundary of image and a device for discriminating a boundary of image, which effectively discriminate whether an image has a boundary and in which direction the boundary is, thus a display effect of a display panel is improved.

Accordingly, the present disclosure provides the following technical solutions.

The present disclosure provides a method for discriminating a boundary of image, comprising:

receiving a component value information of a grayscale parameter of each sub-pixel unit from among an image information to be discriminated to form a matrix of grayscale parameter values, and dividing, with a grayscale parameter value corresponding to a sub-image unit to be processed as a center, the matrix of grayscale parameter values into a n×n matrix and a (n+2)×(n+2) matrix, n representing a number of grayscale parameter values in a row direction or in a column direction, and n being an odd number greater than 1, the grayscale parameter being a luminance parameter or a chromaticity parameter;

determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides;

determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient;

outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient, N being a constant greater than 1;

determining, based on an outputted code value, whether the image to be discriminated has a boundary and in which direction the boundary is.

The method for discriminating the boundary of image provided by the present disclosure can process the received image information to be discriminated based on either the luminance component or the chromaticity component, obtain a n×n matrix and a (n+2)×(n+2) matrix with a grayscale parameter value corresponding to a sub-image unit to be processed as a center, adopt parameters such as gradient, standard deviation, dispersion, and so on to discriminate an image to which the n×n matrix and the (n+2)×(n+2) matrix corresponds respectively, so that the method can discriminate whether an image has a boundary and in which direction the boundary is, thus a display effect of a display panel is improved. A correct filter may be selected according to a discriminating result, to improve processing effect achieved by the filter on the image, thus improving display effect of the display panel.

In some optional embodiments, determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides comprises:

determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides, the gradient in each direction is a sum $$G_x = \sum_{i=1}^{n} |Y_{xi} - Y_{x(i+1)}|$$

of absolute values of two adjacent grayscale parameter values in this direction, G representing a gradient, x representing a direction, $Y_{xi}$ representing an i-th grayscale parameter value in the x direction, n representing a number of grayscale parameter values in a row direction or in a column direction;

comparing the gradient in the row direction, the gradient in the column direction, the gradient in the first diagonal direction, and the gradient in the second diagonal direction in the n×n matrix to obtain a first minimum gradient, comparing the gradient in the row direction, the gradient in the column direction, the gradient in the first diagonal direction, and the gradient in the second diagonal direction in the (n+2)×(n+2) matrix to obtain a second minimum gradient;

determining, based on formula $$S_x = \frac{1}{n}\sqrt{\sum_{i=1}^{n}(Y_{xi} - \overline{Y}_x)^2},$$

in the n×n matrix and the (n+2)×(n+2) matrix: a standard deviation in a row direction, a standard deviation in a column direction, a standard deviation in a first diagonal direction, and a standard deviation in a second diagonal direction, where the grayscale parameter value corresponding to the sub-image unit to be processed resides, wherein S represents the standard deviation, x represents a direction, $Y_{xi}$ represents an i-th grayscale parameter value in the x direction, $\overline{Y}_x$ represents an average of grayscale parameter values in the x direction, n represents the number of gray scale parameter values in a row direction or in a column direction, $$\overline{Y}_x = \frac{\sum_{i=1}^{n} Y_{xi}}{n};$$

comparing the standard deviation in the row direction, the standard deviation in the column direction, the standard deviation in the first diagonal direction, and the standard deviation in the second diagonal direction in the n×n matrix to obtain a first minimum standard deviation, comparing the standard deviation in the row direction, the standard deviation in the column direction, the standard deviation in the first diagonal direction, and the standard deviation in the second diagonal direction in the (n+2)×(n+2) matrix to obtain a second minimum standard deviation.

In some optional embodiments, determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient comprises:

determining, based on formula $$Dif = \frac{1}{3}\sqrt{(H-A)^2 + (V-A)^2 + (LD-A)^2 + (RD-A)^2},$$

in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient, wherein when H, V, LD, RD respectively represent the gradient in the row direction, the gradient in the column direction, the gradient in the first diagonal direction, and the gradient in the second diagonal direction in the n×n matrix, A represents the first minimum gradient, Dif represents a first dispersion; when H, V, LD, RD respectively represent the standard deviation in the row direction, the standard deviation in the column direction, the standard deviation in the first diagonal direction, and the standard deviation in the second diagonal direction in the n×n matrix, A represents the first minimum standard deviation, Dif represents a second dispersion; when H, V, LD, RD respectively represent the gradient in the row direction, the gradient in the column direction, the gradient in the first diagonal direction, and the gradient in the second diagonal direction in the (n+2)×(n+2) matrix, A represents the second minimum gradient, Dif represents a third dispersion; when H, V, LD, RD respectively represent the standard deviation in the row direction, the standard deviation in the column direction, the standard deviation in the first diagonal direction, and the standard deviation in the second diagonal direction in the (n+2)×(n+2) matrix, A represents the second minimum standard deviation, Dif represents a fourth dispersion.

In some optional embodiments, the outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient comprises:

if Dif>N×A, then outputting the first code value accordingly, if Dif<N×A, then outputting the second code value accordingly, N being a constant greater than 1; when Dif represents the first dispersion, A represents the first minimum gradient; when Dif represents the second dispersion, A represents the first minimum standard deviation; when Dif represents the third dispersion, A represents the second minimum gradient; when Dif represents the fourth dispersion, A represents the second minimum standard deviation.

In some optional embodiments, N is a value ranging from 1.4 to 2.0.

In some optional embodiments, N is a value of 5/3.

In some optional embodiments, determining, based on an outputted code value, whether the image to be discriminated has a boundary and in which direction the boundary is comprises:

when the outputted code values to which the first dispersion, the second dispersion, the third dispersion, and the fourth dispersion correspond all are the second code value, then determining that the image to be discriminated has no boundary;

when the outputted code values to which the first dispersion, the second dispersion, the third dispersion, and the fourth dispersion correspond all are the first code value, then determining that the image to be discriminated has a boundary, and the boundary is in a direction to which smaller one of the second gradient and the second standard deviation corresponds;

when the outputted code values to which the first dispersion, the second dispersion, and the fourth dispersion correspond are the first code value, and the outputted code value to which the third dispersion corresponds is the second code value, then determining that the image to be discriminated has a boundary, and the boundary is in a direction to which smaller one of the first gradient and the first standard deviation corresponds;

when the outputted code values to which the first dispersion, the second dispersion, and the third dispersion correspond are the first code value, and the outputted code value to which the fourth dispersion corresponds is the second code value, then determining that the image to be discriminated has a boundary, and the boundary is in a direction to which smaller one of the first gradient and the first standard deviation corresponds;

when the outputted code values to which the first dispersion and the second dispersion correspond are the first code value, and the outputted code values to which the third dispersion and the fourth dispersion correspond are the second code value, then determining that the image to be discriminated has a boundary, and the boundary is in a direction to which smaller one of the first gradient and the first standard deviation corresponds.

In some optional embodiments, the first code value is 1, the second code value is 0.

The present disclosure further provides a device for discriminating a boundary of image, comprising:

a receiving module for receiving a component value information of a grayscale parameter of each sub-pixel unit from among an image information to be discriminated to form a matrix of grayscale parameter values, and dividing, with a grayscale parameter value corresponding to a sub-image unit to be processed as a center, the matrix of grayscale parameter values into a n×n matrix and a (n+2)×(n+2) matrix, n representing the number of grayscale parameter values in a row direction or in a column direction, and n being an odd number greater than 1, the grayscale parameter being a luminance parameter or a chromaticity parameter;

a first determining module for determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides;

a second determining module for determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient;

an analyzing module for outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient, N being a constant greater than 1;

a judging module for determining, based on an outputted code value, whether the image to be discriminated has a boundary and in which direction the boundary is.

The present disclosure further provides a display panel, comprising the device for discriminating the boundary of image as described above.

BRIEF DESCRIPTION OF THE DRAWINGS

FIG. 2 is a schematic diagram of a first distribution of a n×n matrix and a (n+2)×(n+2) matrix provided by an embodiment of the present disclosure;

FIG. 3 is a schematic diagram of a second distribution of a n×n matrix and a (n+2)×(n+2) matrix provided by an embodiment of the present disclosure;

DETAILED DESCRIPTION OF THE EMBODIMENTS

Hereinafter, the technical solutions in the embodiments of the present disclosure will be described clearly and comprehensively in combination with the drawings in the embodiments of the present disclosure. Obviously, these described embodiments are parts of the embodiments of the present disclosure, rather than all of the embodiments thereof. All the other embodiments obtained by those skilled in the art based on the embodiments of the present disclosure without paying creative efforts fall within the protection scope of the present disclosure.

To implement filtering in different situations, it needs to process luminance signals of input data, design discriminating process, identify sharp boundaries therein, classify specific horizontal line, vertical line, left diagonal line, and right diagonal line, thereby adopting different filters.

Figure 1:
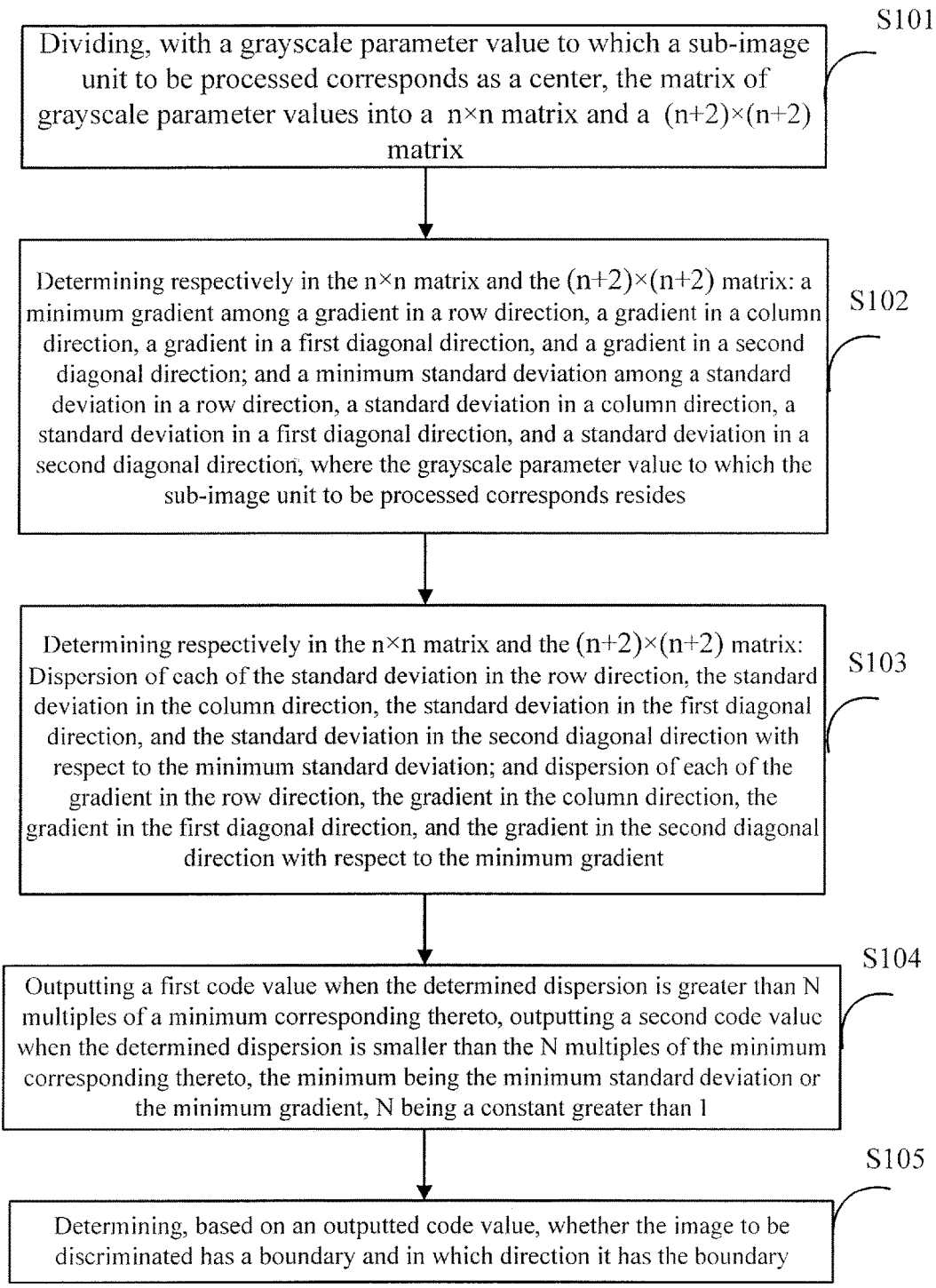
FIG. 1 is a flowchart of a method for discriminating a boundary of image provided by an embodiment of the present disclosure.

To facilitate discriminating an image boundary, as shown in FIG. 1, FIG. 1 a flowchart of a method for discriminating a boundary of image provided by an embodiment of the present disclosure, the present disclosure provides a method for discriminating a boundary of image comprising:

step S101, receiving a component value information of a grayscale parameter of each sub-pixel unit from among an image information to be discriminated to form a matrix of grayscale parameter values, and dividing, with a grayscale parameter value corresponding to a sub-image unit to be processed as a center, the matrix of grayscale parameter values into a n×n matrix and a (n+2)×(n+2) matrix, n representing a number of grayscale parameter values in a row direction or in a column direction, and n being an odd number greater than 1, the grayscale parameter being a luminance parameter or a chromaticity parameter;

step S102, determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides;

step S103, determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient;

step S104, outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient, N being a constant greater than 1;

step S105, determining, based on an outputted code value, whether the image to be discriminated has a boundary and in which direction the boundary is.

The method for discriminating the boundary of image provided by the present disclosure can process the received image information to be discriminated based on either the luminance component or the chromaticity component, obtain an n×n matrix and an (n+2)×(n+2) matrix with a grayscale parameter value corresponding to a sub-image unit to be processed as a center, adopt parameters such as gradient, standard deviation, dispersion, and so on to discriminate an image to which the n×n matrix and the (n+2)×(n+2) matrix corresponds respectively, so that the method can discriminate whether an image has a boundary and in which direction the boundary is. A correct filter may be selected according to a discriminating result, to improve processing effect achieved by the filter on the image, thus a display effect of a display panel is improved.

As shown in FIG. 2, FIG. 2 is a schematic diagram of a first distribution of a n×n matrix and a (n+2)×(n+2) matrix provided by an embodiment of the present disclosure. To facilitate understanding the method for discriminating the boundary of image provided by the present disclosure, the method for discriminating the boundary of image provided by the present disclosure will be explained with reference to FIG. 2. A 3×3 matrix and a 5×5 matrix are shown, wherein $Y_{3,3}$ represents a grayscale parameter value to which a sub-pixel unit to be processed corresponds.

The above step S102 of determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides specifically comprises steps as below.

determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides, the gradient in each direction is a sum $$G_x = \sum_{i=1}^{n} |Y_{xi} - Y_{x(i+1)}|$$

of absolute values of two adjacent grayscale parameter values in this direction, G representing a gradient, x representing a direction (in this scheme the direction is a row direction or a column direction), $Y_{xi}$ representing an i-th grayscale parameter value in the x direction, n representing the number of grayscale parameter values in a row direction or in a column direction (in fact, it is the number of grayscale parameter values in the x direction, but in the present disclosure, the number in the row direction and the number in the column direction are the same).

With the matrix shown in FIG. 2 as example, in the 3×3 matrix:

the gradient in a horizontal direction:

$$G_{H9} = \sum_{i=1}^{3} |Y_{Hi} - Y_{H(i+1)}| = |Y_{3,2} - Y_{3,3}| + |Y_{3,3} - Y_{3,4}|;$$

the gradient in a vertical direction:

$$G_{V9} = \sum_{i=1}^{3} |Y_{Vi} - Y_{V(i+1)}| = |Y_{2,3} - Y_{3,3}| + |Y_{3,3} - Y_{4,3}|;$$

the gradient in the first diagonal direction:

$$G_{LD9} = \sum_{i=1}^{3} |Y_{LDi} - Y_{LD(i+1)}| = |Y_{2,4} - Y_{3,3}| + |Y_{3,3} - Y_{4,2}|;$$

the gradient in the second diagonal direction:

$$G_{RD9} = \sum_{i=1}^{3} |Y_{RDi} - Y_{RD(i+1)}| = |Y_{2,2} - Y_{3,3}| + |Y_{3,3} - Y_{4,4}|;$$

in the 5×5 matrix:
the gradient in a horizontal direction:

$$G_{H25} = \sum_{i=1}^{5} |Y_{Hi} - Y_{H(i+1)}| = |Y_{3,1} - Y_{3,2}| + |Y_{3,2} - Y_{3,3}| + |Y_{3,3} - Y_{3,4}| + |Y_{3,4} - Y_{3,5}|;$$

the gradient in a vertical direction:

$$G_{V25} = \sum_{i=1}^{5} |Y_{Vi} - Y_{V(i+1)}| = |Y_{1,3} - Y_{2,3}| + |Y_{2,3} - Y_{3,3}| + |Y_{3,3} - Y_{4,3}| + |Y_{4,3} - Y_{5,3}|;$$

the gradient in the first diagonal direction:

$$G_{LD25} = \sum_{i=1}^{5} |Y_{LDi} - Y_{LD(i+1)}| = |Y_{1,5} - Y_{2,4}| + |Y_{2,4} - Y_{3,3}| + |Y_{3,3} - Y_{4,2}| + |Y_{4,2} - Y_{5,1}|;$$

the gradient in the second diagonal direction:

$$G_{RD25} = \sum_{i=1}^{5} |Y_{RDi} - Y_{RD(i+1)}| = |Y_{1,1} - Y_{2,2}| + |Y_{2,2} - Y_{3,3}| + |Y_{3,3} - Y_{4,4}| + |Y_{4,4} - Y_{5,5}|;$$

The above step S102 further comprises: comparing the gradient in the row direction, the gradient in the column direction, the gradient in the first diagonal direction, and the gradient in the second diagonal direction in the n×n matrix to obtain a first minimum gradient; comparing the gradient in the row direction, the gradient in the column direction, the gradient in the first diagonal direction, and the gradient in the second diagonal direction in the (n+2)×(n+2) matrix to obtain a second minimum gradient;

As shown in FIG. 2, it is supposed that a comparison result is that the first minimum gradient is $G_{V9}$, the second minimum gradient is $G_{LD25}$.

The above step S102 further comprises: determining, based on formula $$S_x = \frac{1}{n}\sqrt{\sum_{i=1}^{n}(Y_{xi} - \overline{Y}_x)^2},$$

in the n×n matrix and the (n+2)×(n+2) matrix: a standard deviation in a row direction, a standard deviation in a column direction, a standard deviation in a first diagonal direction, and a standard deviation in a second diagonal direction, where the grayscale parameter value corresponding to the sub-image unit to be processed resides, wherein S represents the standard deviation, x represents a direction, $Y_{xi}$ represents an i-th grayscale parameter value in the x direction, $\overline{Y}_x$ represents an average of grayscale parameter values in the x direction, n represents the number of gray scale parameter values in a row direction or in a column direction, $$\overline{Y}_x = \frac{\sum_{i=1}^{n} Y_{xi}}{n}.$$

With the matrix shown in FIG. 2 as example, in the 3×3 matrix:

the standard deviation in a horizontal direction:

$$S_{H9} = \frac{1}{3}\sqrt{\sum_{i=1}^{3}(Y_{xi} - \overline{Y}_x)^2} = \frac{1}{3}\sqrt{(Y_{3,2} - \overline{Y}_H)^2 + (Y_{3,3} - \overline{Y}_H)^2 + (Y_{3,4} - \overline{Y}_H)^2};$$

$$\overline{Y}_H = \frac{\sum_{i=1}^{3} Y_{Hi}}{3} = \frac{Y_{3,2} + Y_{3,3} + Y_{3,4}}{3};$$

the standard deviation in a vertical direction:

$$S_{V9} = \frac{1}{3}\sqrt{\sum_{i=1}^{3}(Y_{Vi} - \overline{Y}_V)^2} = \frac{1}{3}\sqrt{(Y_{2,3} - \overline{Y}_V)^2 + (Y_{3,3} - \overline{Y}_V)^2 + (Y_{4,3} - \overline{Y}_V)^2};$$

$$\overline{Y}_V = \frac{\sum_{i=1}^{3} Y_{Vi}}{3} = \frac{Y_{2,3} + Y_{3,3} + Y_{4,3}}{3}$$

the standard deviation in a first diagonal direction:

$$S_{LD9} = \frac{1}{3}\sqrt{\sum_{i=1}^{3}(Y_{LDi} - \overline{Y}_{LD})^2} = \frac{1}{3}\sqrt{(Y_{2,4} - \overline{Y}_{LD})^2 + (Y_{3,3} - \overline{Y}_{LD})^2 + (Y_{4,2} - \overline{Y}_{LD})^2};$$

$$\overline{Y}_{LD} = \frac{\sum_{i=1}^{3} Y_{LDi}}{3} = \frac{Y_{2,4} + Y_{3,3} + Y_{4,2}}{3};$$

the standard deviation in the second diagonal direction:

$$S_{RD9} = \frac{1}{3}\sqrt{\sum_{i=1}^{3}(Y_{RDi} - \overline{Y}_{RD})^2} = \frac{1}{3}\sqrt{(Y_{2,2} - \overline{Y}_{RD})^2 + (Y_{3,3} - \overline{Y}_{RD})^2 + (Y_{4,4} - \overline{Y}_{RD})^2};$$

$$\overline{Y}_{RD} = \frac{\sum_{i=1}^{3} Y_{RDi}}{3} = \frac{Y_{2,2} + Y_{3,3} + Y_{4,4}}{3}.$$

In the 5×5 matrix:

the standard deviation in a horizontal direction:

$$S_{H25} = \frac{1}{5}\sqrt{\sum_{i=1}^{5}(Y_{Hi} - \overline{Y}_H)^2} = \frac{1}{5}\sqrt{\begin{array}{l}(Y_{3,1} - \overline{Y}_H)^2 + (Y_{3,2} - \overline{Y}_H)^2 + \\ (Y_{3,3} - \overline{Y}_H)^2 + (Y_{3,4} - \overline{Y}_H) + (Y_{3,5} - \overline{Y}_H)^2\end{array}};$$

$$\overline{Y}_H = \frac{\sum_{i=1}^{5} Y_{Hi}}{5} = \frac{Y_{3,1} + Y_{3,2} + Y_{3,3} + Y_{3,4} + Y_{3,5}}{5};$$

the standard deviation in a vertical direction:

$$S_{V25} = \frac{1}{5}\sqrt{\sum_{i=1}^{5}(Y_{Vi} - \overline{Y}_V)^2} = \frac{1}{5}\sqrt{\begin{array}{l}(Y_{1,3} - \overline{Y}_V)^2 + (Y_{2,3} - \overline{Y}_V)^2 + \\ (Y_{3,3} - \overline{Y}_V)^2 + (Y_{4,3} - \overline{Y}_V) + (Y_{5,3} - \overline{Y}_V)^2\end{array}};$$

$$\overline{Y}_V = \frac{\sum_{i=1}^{5} Y_{Vi}}{5} = \frac{Y_{1,3} + Y_{2,3} + Y_{3,3} + Y_{4,3} + Y_{5,3}}{5};$$

the standard deviation in a first diagonal direction:

$$S_{LD25} = \frac{1}{5}\sqrt{\sum_{i=1}^{5}(Y_{LDi} - \overline{Y}_{LD})^2} =$$

$$\frac{1}{5}\sqrt{\begin{array}{l}(Y_{1,5} - \overline{Y}_{LD})^2 + (Y_{2,4} - \overline{Y}_{LD})^2 + \\ (Y_{3,3} - \overline{Y}_{LD})^2 + (Y_{4,2} - \overline{Y}_{LD}) + (Y_{5,1} - \overline{Y}_{LD})^2\end{array}};$$

$$\overline{Y}_{LD} = \frac{\sum_{i=1}^{5} Y_{LDi}}{5} = \frac{Y_{1,5} + Y_{2,4} + Y_{3,3} + Y_{4,2} + Y_{5,1}}{5};$$

the standard deviation in the second diagonal direction:

$$S_{RD25} = \frac{1}{5}\sqrt{\sum_{i=1}^{5}(Y_{RDi} - \overline{Y}_{RD})^2} =$$

$$\frac{1}{5}\sqrt{\begin{array}{l}(Y_{1,1} - \overline{Y}_{RD})^2 + (Y_{2,2} - \overline{Y}_{RD})^2 + \\ (Y_{3,3} - \overline{Y}_{RD})^2 + (Y_{4,4} - \overline{Y}_{RD})^2 + (Y_{5,5} - \overline{Y}_{RD})^2\end{array}};$$

$$\overline{Y}_{RD} = \frac{\sum_{i=1}^{5} Y_{RDi}}{5} = \frac{Y_{1,1} + Y_{2,2} + Y_{3,3} + Y_{4,4} + Y_{5,5}}{5};$$

The above step S102 further comprises: comparing the standard deviation in the row direction, the standard deviation in the column direction, the standard deviation in the first diagonal direction, and the standard deviation in the second diagonal direction in the n×n matrix to obtain a first minimum standard deviation; and comparing the standard deviation in the row direction, the standard deviation in the column direction, the standard deviation in the first diagonal direction, and the standard deviation in the second diagonal direction in the (n+2)×(n+2) matrix to obtain a second minimum standard deviation.

In the matrixes shown in FIG. 2, it is supposed that the comparison result is that the first minimum standard deviation is $S_{H9}$, the second minimum standard deviation is $S_{RD25}$.

The step S103 of determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient specifically comprises:

determining, based on formula $$Dif = \frac{1}{3}\sqrt{(H - A)^2 + (V - A)^2 + (LD - A)^2 + (RD - A)^2},$$

in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient. When H, V, LD, RD respectively represent the gradient in the row direction, the gradient in the column direction, the gradient in the first diagonal direction, and the gradient in the second diagonal direction in the n×n matrix, A represents the first minimum gradient, Dif represents a first dispersion; when H, V, LD, RD respectively represent the standard deviation in the row direction, the standard deviation in the column direction, the standard deviation in the first diagonal direction, and the standard deviation in the second diagonal direction in the n×n matrix, A represents the first minimum standard deviation, Dif represents a second dispersion; when H, V, LD, RD respectively represent the gradient in the row direction, the gradient in the column direction, the gradient in the first diagonal direction, and the gradient in the second diagonal direction in the (n+2)×(n+2) matrix, A represents the second minimum gradient, Dif represents a third dispersion; when H, V, LD, RD respectively represent the standard deviation in the row direction, the standard deviation in the column direction, the standard deviation in the first diagonal direction, and the standard deviation in the second diagonal direction in the (n+2)×(n+2) matrix, A represents the second minimum standard deviation, Dif represents a fourth dispersion.

With the matrix shown in FIG. 2 as example,
the first dispersion:

$$Dif = \frac{1}{3}\sqrt{(G_{H9} - G_{V9})^2 + (G_{V9} - G_{V9})^2 + (G_{LD9} - G_{V9})^2 + (G_{RD9} - G_{V9})^2} ;$$

the second dispersion:

$$Dif = \frac{1}{3}\sqrt{(S_{H9} - S_{H9})^2 + (S_{V9} - S_{H9})^2 + (S_{LD9} - S_{H9})^2 + (S_{RD9} - S_{S9})^2} ;$$

the third dispersion:

$$Dif = \frac{1}{3}\sqrt{\frac{(G_{H25} - G_{LD25})^2 + (G_{V25} - G_{LD25})^2 +}{(G_{LD25} - G_{LD25})^2 + (G_{RD25} - G_{LD25})^2}} ;$$

the fourth dispersion:

$$Dif = \frac{1}{3}\sqrt{\frac{(S_{H25} - S_{RD25})^2 + (S_{V25} - S_{RD25})^2 +}{(S_{LD25} - S_{RD25})^2 + (S_{RD25} - S_{RD25})^2}} .$$

In step S104, outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient specifically comprises:

if Dif>N×A, then outputting the first code value accordingly; if Dif<N×A, then outputting the second code value accordingly, N being a constant greater than 1; when Dif represents the first dispersion, A represents the first minimum gradient; when Dif represents the second dispersion, A represents the first minimum standard deviation; when Dif represents the third dispersion, A represents the second minimum gradient; when Dif represents the fourth dispersion, A represents the second minimum standard deviation.

With the matrix shown in FIG. 2 as example, the discriminating process is:

when the first dispersion Dif>NG$_{V9}$, outputting the first code value correspondingly, when the first dispersion Dif<NG$_{V9}$, outputting the second code value correspondingly;

when the second dispersion Dif>NS$_{H9}$, outputting the first code value correspondingly, when the second dispersion Dif<NS$_{H9}$, outputting the second code value correspondingly;

when the third dispersion Dif>NG$_{LD25}$, outputting the first code value correspondingly, when the third dispersion Dif<NG$_{LD25}$, outputting the second code value correspondingly;

when the fourth dispersion Dif>NS$_{RD25}$, outputting the first code value correspondingly, when the fourth dispersion Dif<NS$_{RD25}$, outputting the second code value correspondingly.

After many experiments, it can be known that, when N is a value in a range from 1.4 to 2.0, the method for discriminating the boundary of image provided by the present disclosure has a relatively high accuracy.

Optionally, N is a value of 5/3. In this case, the method for discriminating the boundary of image provided by the present disclosure has the highest accuracy.

In step S105, determining, based on an outputted code value, whether the image to be discriminated has a boundary and in which direction the boundary is specifically comprises:

when the outputted code values to which the first dispersion, the second dispersion, the third dispersion, and the fourth dispersion correspond all are the second code value, then determining that the image to be discriminated has no boundary;

when the outputted code values to which the first dispersion, the second dispersion, the third dispersion, and the fourth dispersion correspond all are the first code value, then determining that the image to be discriminated has a boundary, and the boundary is in a direction to which the smaller value of the second gradient and the second standard deviation corresponds;

when the outputted code values to which the first dispersion, the second dispersion, and the fourth dispersion correspond are the first code value, and the outputted code value to which the third dispersion corresponds is the second code value, then determining that the image to be discriminated has a boundary, and the boundary is in a direction to which the smaller value of the first gradient and the first standard deviation corresponds;

when the outputted code values to which the first dispersion, the second dispersion, and the third dispersion correspond are the first code value, and the outputted code value to which the fourth dispersion corresponds is the second code value, then determining that the image to be discriminated has a boundary, and the boundary is in a direction to which the smaller value of the first gradient and the first standard deviation corresponds;

when the outputted code values to which the first dispersion and the second dispersion correspond are the first code value, and the outputted code values to which the third dispersion and the fourth dispersion correspond are the second code value, then determining that the image to be discriminated has a boundary, and the boundary is in a direction to which the smaller value of the first gradient and the first standard deviation corresponds.

With FIG. 2 as example, when the outputted code values to which the first dispersion, the second dispersion, the third dispersion, and the fourth dispersion correspond all are the second code value, then determining that the image to be discriminated has no boundary;

when the outputted code values to which the first dispersion, the second dispersion, the third dispersion, and the fourth dispersion correspond all are the first code value, then determining that the image to be discriminated has a boundary, if G$_{LD25}$<S$_{RD25}$, then there is a boundary in the first diagonal direction in the 5×5 matrix; if $G_{LD25}>S_{RD25}$, then there is a boundary in the second diagonal direction in the 5×5 matrix;

when the outputted code values to which the first dispersion, the second dispersion, and the fourth dispersion correspond are the first code value, and the outputted code value to which the third dispersion corresponds is the second code value, then determining that the image to be discriminated has a boundary, if $G_{V9}<S_{H9}$, then there is a boundary in the vertical direction in the 3×3 matrix; if $G_{V9}>S_{H9}$, then there is a boundary in the horizontal direction in the 3×3 matrix;

when the outputted code values to which the first dispersion, the second dispersion, and the third dispersion correspond are the first code value, and the outputted code value to which the fourth dispersion corresponds is the second code value, then determining that the image to be discriminated has a boundary, if $G_{V9}<S_{H9}$, then there is a boundary in the vertical direction in the 3×3 matrix; if $G_{V9}>S_{H9}$, then there is a boundary in the horizontal direction in the 3×3 matrix;

when the outputted code values to which the first dispersion and the second dispersion correspond are the first code value, and the outputted code values to which the third dispersion and the fourth dispersion correspond are the second code value, then determining that the image to be discriminated has a boundary, if $G_{V9}<S_{H9}$, then there is a boundary in the vertical direction in the 3×3 matrix; if $G_{V9}>S_{H9}$, then there is a boundary in the horizontal direction in the 3×3 matrix.

Optionally, the first code value is 1, the second code value is 0. Of course, the first code value and the second code value may be other values, so long as the first code value and the second code value can be differentiated.

Hereinafter, the method for discriminating the boundary of image provided by the present disclosure will be described in detail in conjunction with specific luminance values.

As shown in FIG. 3, FIG. 3 is a schematic diagram of a second distribution of a n×n matrix and a (n+2)×(n+2) matrix provided by an embodiment of the present disclosure.

In 3×3 matrix:
the gradient in a horizontal direction:

$$G_{H9} = \sum_{i=1}^{3} |Y_{Hi} - Y_{H(i+1)}| = |101 - 228| + |228 - 95| = 260;$$

the gradient in a vertical direction:

$$G_{V9} = \sum_{i=1}^{3} |Y_{Vi} - Y_{V(i+1)}| = |118 - 228| + |228 - 221| = 117;$$

the gradient in the first diagonal direction:

$$G_{LD9} = \sum_{i=1}^{3} |Y_{LDi} - Y_{LD(i+1)}| = |161 - 228| + |228 - 36| = 259;$$

the gradient in the second diagonal direction:

$$G_{RD9} = \sum_{i=1}^{3} |Y_{RDi} - Y_{RD(i+1)}| = |242 - 228| + |228 - 250| = 36;$$

by comparing the above gradients, it can be known that the minimum first gradient is the gradient in the second diagonal direction.

In the 5×5 matrix:
the gradient in a horizontal direction:

$$G_{H25} = \sum_{i=1}^{5} |Y_{Hi} - Y_{H(i+1)}| =$$

$$|177 - 101| + |101 - 228| + |228 - 95| + |95 - 56| = 375;$$

the gradient in a vertical direction:

$$G_{V25} = \sum_{i=1}^{5} |Y_{Vi} - Y_{V(i+1)}| =$$

$$|195 - 118| + |118 - 228| + |228 - 221| + |221 - 175| = 240;$$

the gradient in the first diagonal direction:

$$G_{LD25} = \sum_{i=1}^{5} |Y_{LDi} - Y_{LD(i+1)}| =$$

$$|225 - 161| + |161 - 228| + |228 - 36| + |36 - 179| = 466;$$

the gradient in the second diagonal direction:

$$G_{RD25} = \sum_{i=1}^{5} |Y_{RDi} - Y_{RD(i+1)}| =$$

$$|71 - 242| + |242 - 228| + |228 - 250| + |250 - 18| = 439$$

by comparing the above gradients, it can be known that the minimum second gradient is the gradient in the vertical direction.

In the 3×3 matrix:
the standard deviation in a horizontal direction:

$$S_{H9} = \frac{1}{3}\sqrt{\sum_{i=1}^{3}(Y_{xi} - \overline{Y}_s)^2} =$$

$$\frac{1}{3}\sqrt{(101 - 141.33)^2 + (228 - 141.33)^2 + (95 - 141.33)^2} = 61.33152$$

$$\overline{Y}_H = \frac{\sum_{i=1}^{3} Y_{Hi}}{3} = \frac{101 + 228 + 95}{3} = 141.33;$$

the standard deviation in a vertical direction:

$$S_{V9} = \frac{1}{3}\sqrt{\sum_{i=1}^{3}(Y_{Vi}-\overline{Y}_V)^2} =$$

$$\frac{1}{3}\sqrt{(118-189)^2+(228-189)^2+(221-189)^2} = 50.28585$$

$$\overline{Y}_V = \frac{\sum_{i=1}^{3}Y_{Vi}}{3} = \frac{118+228+221}{3} = 189;$$

the standard deviation in a first diagonal direction:

$$S_{LD9} = \frac{1}{3}\sqrt{\sum_{i=1}^{3}(Y_{LDi}-\overline{Y}_{LD})^2} =$$

$$\frac{1}{3}\sqrt{(161-141.67)^2+(228-141.67)^2+(36-141.67)^2} = 79.56688$$

$$\overline{Y}_{LD} = \frac{\sum_{i=1}^{3}Y_{LDi}}{3} = \frac{161+228+36}{3} = 141.67;$$

the standard deviation in the second diagonal direction:

$$S_{RD9} = \frac{1}{3}\sqrt{\sum_{i=1}^{3}(Y_{RDi}-\overline{Y}_{RD})^2} =$$

$$\frac{1}{3}\sqrt{(242-240)^2+(228-240)^2+(250-240)^2} = 9.092121;$$

$$\overline{Y}_{RD} = \frac{\sum_{i=1}^{3}Y_{RDi}}{3} = \frac{242+228+250}{3} = 240;$$

By comparing the above standard deviations, it can be known that the first minimum standard deviation is the standard deviation in the second diagonal direction.

In the 5×5 matrix:
the standard deviation in a horizontal direction:

$$S_{H25} = \frac{1}{5}\sqrt{\sum_{i=1}^{5}(Y_{Hi}-\overline{Y}_H)^2} =$$

$$\frac{1}{5}\sqrt{(177-131.4)^2+(101-131.4)^2+(228-131.4)^2+(95-131.4)^2+(56-131.4)^2} = 74.98166$$

$$\overline{Y}_H = \frac{\sum_{i=1}^{5}Y_{Hi}}{5} = \frac{177+101+228+95+56}{5} = 131.4;$$

the standard deviation in a vertical direction:

$$S_{V25} = \frac{1}{5}\sqrt{\sum_{i=1}^{5}(Y_{Vi}-\overline{Y}_V)^2} =$$

$$\frac{1}{5}\sqrt{(195-187.4)^2+(118-187.4)^2+(228-187.4)^2+(221-187.4)^2+(174-187.4)^2} = 39.51$$

$$\overline{Y}_V = \frac{\sum_{i=1}^{5}Y_{Vi}}{5} = \frac{195+118+228+221+175}{5} = 187.4;$$

the standard deviation in a first diagonal direction:

$$S_{LD25} = \frac{1}{5}\sqrt{\sum_{i=1}^{5}(Y_{LDi}-\overline{Y}_{LD})^2} =$$

$$\frac{1}{5}\sqrt{(225-165.8)^2+(161-165.8)^2+(228-165.8)^2+(36-165.8)^2+(179-165.8)^2} = 69.8839$$

$$\overline{Y}_{LD} = \frac{\sum_{i=1}^{5}Y_{LDi}}{5} = \frac{225+161+228+36+179}{5} = 165.8;$$

the standard deviation in the second diagonal direction:

$$S_{RD25} = \frac{1}{5}\sqrt{\sum_{i=1}^{5}(Y_{RDi}-\overline{Y}_{RD})^2} =$$

$$\frac{1}{5}\sqrt{(71-161.8)^2+(242-161.8)^2+(228-161.8)^2+(250-161.8)^2+(18-161.8)^2} = 97.48518$$

$$\overline{Y}_{RD} = \frac{\sum_{i=1}^{5}Y_{RDi}}{5} = \frac{71+242+228+250+18}{5} = 161.8.$$

By comparing the above standard deviations, it can be known that the second minimum standard deviation is the standard deviation in the vertical direction.

The first dispersion:

$$Dif = \frac{1}{3}\sqrt{(260-36)^2 + (117-36)^2 + (259-36)^2 + (36-36)^2} = 108.7638;$$

the second dispersion:

$$Dif = \frac{1}{3}\sqrt{\begin{array}{l}(61.33152-9.092121)^2 + (50.28585-9.092121)^2 + \\ (79.56688-9.092121)^2 + (9.092121-9.092121)^2\end{array}} = 32.30509;$$

the third dispersion:

$$Dif = \frac{1}{3}\sqrt{(375-240)^2 + (240-240)^2 + (466-240)^2 + (439-240)^2} = 110.001;$$

the fourth dispersion:

$$Dif = \frac{1}{3}\sqrt{\begin{array}{l}(74.98166-39.51)^2 + (39.51-39.51)^2 + \\ (69.8839-39.51)^2 + (97.48518-39.51)^2\end{array}} = 24.81472$$

determining that the first dispersion $$Dif > \frac{5}{3} \times 36,$$

outputting 1, the second dispersion $$Dif > \frac{5}{3} \times 9.092121,$$

outputting 1, the third dispersion $$Dif < \frac{5}{3} \times 240,$$

outputting 0, the fourth dispersion $$Dif < \frac{5}{3} \times 39.51,$$

outputting 0, then it can be determined that the image has a boundary, and the direction of the boundary is the second diagonal direction in the 3×3 matrix.

Figures 4, 5:
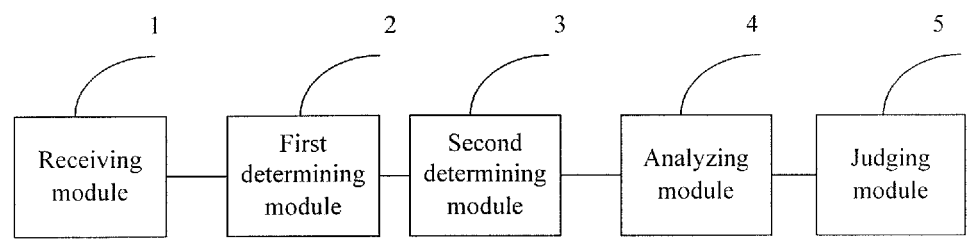
FIG. 4 is a schematic diagram of a third distribution of a n×n matrix and a (n+2)×(n+2) matrix provided by an embodiment of the present disclosure.
FIG. 5 is a schematic diagram of structure of a device for discriminating a boundary of image provided by an embodiment of the present disclosure.

FIG. 4 is a schematic diagram of a third distribution of a n×n matrix and a (n+2)×(n+2) matrix provided by an embodiment of the present disclosure.

In the 3×3 matrix:
the gradient in a horizontal direction:

$$G_{H9} = \sum_{i=1}^{3} |Y_{Hi} - Y_{H(i+1)}| = |174-73| + |73-185| = 213;$$

the gradient in a vertical direction:

$$G_{V9} = \sum_{i=1}^{3} |Y_{Vi} - Y_{V(i+1)}| = |227-73| + |73-251| = 332;$$

the gradient in the first diagonal direction:

$$G_{LD9} = \sum_{i=1}^{3} |Y_{LDi} - Y_{LD(i+1)}| = |68-73| + |73-71| = 7;$$

the gradient in the second diagonal direction:

$$G_{RD9} = \sum_{i=1}^{3} |Y_{RDi} - Y_{RD(i+1)}| = |245-73| + |73-46| = 199.$$

By comparing the above gradients, it can be known that the minimum first gradient is the gradient in the first diagonal direction.

In the 5×5 matrix:
the gradient in a horizontal direction:

$$G_{H25} = \sum_{i=1}^{5} |Y_{Hi} - Y_{H(i+1)}| =$$
$$|45-174| + |174-73| + |73-185| + |185-187| = 344;$$

the gradient in a vertical direction:

$$G_{V25} = \sum_{i=1}^{5} |Y_{Vi} = Y_{V(i+1)}| =$$
$$|241-227| + |227-73| + |73-251| + |251-114| = 483;$$

the gradient in the first diagonal direction:

$$G_{LD25} =$$
$$\sum_{i=1}^{5} |Y_{LDi} - Y_{LD(i+1)}| = |111-68| + |68-73| + |73-71| + |71-71| = 50;$$

the gradient in the second diagonal direction:

$$G_{RD25} = \sum_{i=1}^{5} |Y_{RDi} - Y_{RD(i+1)}| =$$
$$|77-245| + |245-73| + |73-46| + |46-72| = 393.$$

By comparing the above gradients, it can be known that the minimum second gradient is the gradient in the first diagonal direction.

In the 3×3 matrix:

the standard deviation in a horizontal direction:

$$S_{H9} = \frac{1}{3}\sqrt{\sum_{i=1}^{3}(Y_{xi} - \overline{Y}_x)^2} =$$

$$\frac{1}{3}\sqrt{(174-144)^2 + (73-144)^2 + (185-144)^2} = 29.10136$$

$$\overline{Y}_H = \frac{\sum_{i=1}^{3} Y_{Hi}}{3} = \frac{174 + 73 + 185}{3} = 144;$$

the standard deviation in a vertical direction:

$$S_{V9} = \frac{1}{3}\sqrt{\sum_{i=1}^{3}(Y_{Vi} - \overline{Y}_V)^2} =$$

$$\frac{1}{3}\sqrt{(227-183.67)^2 + (73-183.67)^2 + (251-183.67)^2} = 78.86416;$$

$$\overline{Y}_V = \frac{\sum_{i=1}^{3} Y_{Vi}}{3} = \frac{227 + 73 + 251}{3} = 183.67;$$

the standard deviation in a first diagonal direction:

$$S_{LD9} = \frac{1}{3}\sqrt{\sum_{i=1}^{3}(Y_{LDi} - \overline{Y}_{LD})^2} =$$

$$\frac{1}{3}\sqrt{(68-70.67)^2 + (73-70.67)^2 + (71-70.67)^2} = 1.18634$$

$$\overline{Y}_{LD} = \frac{\sum_{i=1}^{3} Y_{LDi}}{3} = \frac{68 + 73 + 71}{3} = 70.67;$$

the standard deviation in the second diagonal direction:

$$S_{RD9} = \frac{1}{3}\sqrt{\sum_{i=1}^{3}(Y_{RDi} - \overline{Y}_{RD})^2} =$$

$$\frac{1}{3}\sqrt{(245-121.34)^2 - (73-121.34)^2 + (46-121.34)^2} = 88.13752$$

$$\overline{Y}_{RD} = \frac{\sum_{i=1}^{3} Y_{RDi}}{3} = \frac{245 + 73 + 46}{3} = 121.34.$$

By comparing the above standard deviations, it can be known that the first minimum standard deviation is the standard deviation in the first diagonal direction.

In the 5×5 matrix:

the standard deviation in a horizontal direction:

$$S_{H25} = \frac{1}{5}\sqrt{\sum_{i=1}^{5}(Y_{Hi} - \overline{Y}_H)^2} =$$

$$\frac{1}{5}\sqrt{\begin{array}{c}(45-132.8)^2 + (174-132.8)^2 + (73-132.8)^2 + \\ (185-132.8)^2 + (187-132.8)^2\end{array}} = 74.54454$$

$$\overline{Y}_H = \frac{\sum_{i=1}^{5} Y_{Hi}}{5} = \frac{45 + 174 + 73 + 185 + 187}{5} = 132.8;$$

the standard deviation in a vertical direction:

$$S_{V25} = \frac{1}{5}\sqrt{\sum_{i=1}^{5}(Y_{Vi} - \overline{Y}_V)^2}$$

$$= \frac{1}{5}\sqrt{\begin{array}{c}(241-181.2)^2 + (227-181.2)^2 + (73-181.2)^2 + \\ (251-181.2)^2 + (114-181.2)^2\end{array}}$$

$$= 73.16939$$

$$\overline{Y}_V = \frac{\sum_{i=1}^{5} Y_{Vi}}{5} = \frac{241 + 227 + 73 + 251 + 114}{5} = 181.2;$$

the standard deviation in a first diagonal direction:

$$S_{LD25} = \frac{1}{5}\sqrt{\sum_{i=1}^{5}(Y_{LDi} - \overline{Y}_{LD})^2}$$

$$= \frac{1}{5}\sqrt{\begin{array}{c}(111-78.8)^2 + (68-78.8)^2 + (73-78.8)^2 + \\ (71-78.8)^2 + (71-78.8)^2\end{array}}$$

$$= 16.179$$

$$\overline{Y}_{LD} = \frac{\sum_{i=1}^{5} Y_{LDi}}{5} = \frac{111 + 68 + 73 + 71 + 71}{5} = 78.8;$$

the standard deviation in the second diagonal direction:

$$S_{RD25} = \frac{1}{5}\sqrt{\sum_{i=1}^{5}(Y_{RDi} - \overline{Y}_{RD})^2}$$

$$= \frac{1}{5}\sqrt{\begin{array}{c}(77-102.6)^2 + (245-102.6)^2 + (73-102.6)^2 + \\ (46-102.6)^2 + (72-102.6)^2\end{array}}$$

$$= 72.04054$$

$$\overline{Y}_{RD} = \frac{\sum_{i=1}^{5} Y_{RDi}}{5} = \frac{77 + 245 + 73 + 46 + 72}{5} = 102.6.$$

By comparing the above standard deviations, it can be known that the second minimum standard deviation is the standard deviation in the first diagonal direction.

The first dispersion:

$$Dif = \frac{1}{3}\sqrt{(213-7)^2 + (332-7)^2 + (7-7)^2 + (199-7)^2}$$

$$= 143.343;$$

the second dispersion:

$$Dif = \frac{1}{3}\sqrt{\begin{array}{c}(50.40503-1.18634)^2 + (78.86416-1.18634)^2 + \\ (1.18634-1.18634)^2 + (88.13752-1.18634)^2\end{array}}$$

$$= 42.18587;$$

the third dispersion:

$$Dif = \frac{1}{3}\sqrt{(344-50)^2 + (483-50)^2 + (50-50)^2 + (393-50)^2}$$

$$= 208.5862;$$

the fourth dispersion:

$$Dif = \frac{1}{3}\sqrt{\begin{array}{c}(74.5445-16.179)^2 + (73.16939-16.179)^2 + \\ (16.179-16.179)^2 + (72.04054-16.179)^2\end{array}}$$

$$= 32.95612$$

Discrimination is performed as follows: the first dispersion $$Dif > \frac{5}{3} \times 7,$$

outputting 1, the second dispersion $$Dif > \frac{5}{3} \times 1.18634,$$

outputting 1, the third dispersion $$Dif > \frac{5}{3} \times 50,$$

outputting 1, the fourth dispersion $$Dif > \frac{5}{3} \times 16.179,$$

outputting 1, then it can be determined that the image has a boundary and the direction of the boundary is the first diagonal direction in the 5×5 matrix.

It needs to be noted that, the above method is applicable to an image in any form of sub-pixel arrangement.

As shown in FIG. 5, FIG. 5 is a schematic diagram of structure of a device for discriminating a boundary of image provided by an embodiment of the present disclosure. The present disclosure further provides an image boundary discriminating device, comprising a receiving module 1, a first determining module 2, a second determining module 3, an analyzing module 4, and a judging module 5.

The receiving module 1 is for receiving a component value information of a grayscale parameter of each sub-pixel unit from among an image information to be discriminated to form a matrix of grayscale parameter values, and dividing, with a grayscale parameter value corresponding to a sub-image unit to be processed as a center, the matrix of grayscale parameter values into a n×n matrix and a (n+2)×(n+2) matrix, n representing a number of grayscale parameter values in a row direction or in a column direction, and n being an odd number greater than 1, the grayscale parameter being a luminance parameter or a chromaticity parameter.

The first determining module 2 is for determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides;

The second determining module 3 is for determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient;

The analyzing module 4 is for outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient, N being a constant greater than 1;

A judging module 5 is for determining, based on an outputted code value, whether the image to be discriminated has a boundary and in which direction the boundary is.

The present disclosure further provides a display panel, comprising the device for discriminating the boundary of image as described above. Based on the merits of the device for discriminating the boundary of image described above, the display panel provided by the present disclosure has better display effect.

Obviously, those skilled in the art can make various modifications and variations to the present disclosure without departing from the spirit and scope thereof. Thus, if these modifications and variations of the present disclosure are within the scope of the claims of the present disclosure as well as their equivalents, the present disclosure is also intended to include these modifications and variations.

The present application claims the priority of Chinese patent application No. 201410415432.9 filed on Aug. 21, 2014, the disclosure of which is incorporated herein as a whole as a portion of the present disclosure.

What is claimed is:

1. A method for discriminating a boundary of image, comprising:
  receiving a component value information of a grayscale parameter of each sub-pixel unit from among an image information to be discriminated to form a matrix of grayscale parameter values, and dividing, with a grayscale parameter value corresponding to a sub-image unit to be processed as a center, the matrix of grayscale parameter values into a n×n matrix and a (n+2)×(n+2) matrix, n representing a number of grayscale parameter values in a row direction or in a column direction, and n being an odd number greater than 1, the grayscale parameter being a luminance parameter or a chromaticity parameter;
  determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides;
  determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient;
  outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient, N being a constant greater than 1;
  determining, based on an outputted code value, whether the image to be discriminated has a boundary and in which direction the boundary is.

2. The method for discriminating the boundary of image as claimed in claim 1, wherein determining respectively in the n×n matrix and the (n+2)×(n+2) matrix: a minimum gradient among a gradient in a row direction, a gradient in a column direction, a gradient in a first diagonal direction, and a gradient in a second diagonal direction, where the grayscale parameter value corresponding to the sub-image unit to be processed resides; and a minimum standard deviation among a standard deviation in a row direction, a standard deviation in a column direction, a standard deviation in a first diagonal direction, and a standard deviation in a second diagonal direction, where the grayscale parameter value corresponding to the sub-image unit to be processed resides comprises:
  determining respectively in the n×n matrix and the (n+2)×(n+2) matrix: a minimum gradient among a gradient in a row direction, a gradient in a column direction, a gradient in a first diagonal direction, and a gradient in a second diagonal direction where the grayscale parameter value corresponding to the sub-image unit to be processed resides, the gradient in each direction is a sum $$G_x = \sum_{i=1}^{n} |Y_{xi} = Y_{x(i+1)}|$$

of absolute values of two adjacent grayscale parameter values in this direction, G representing a gradient, x representing a direction, $Y_{xi}$ representing an i-th grayscale parameter value in the x direction, n representing a number of grayscale parameter values in a row direction or in a column direction;
  comparing the gradient in the row direction, the gradient in the column direction, the gradient in the first diagonal direction, and the gradient in the second diagonal direction in the n×n matrix to obtain a first minimum gradient, comparing the gradient in the row direction, the gradient in the column direction, the gradient in the first diagonal direction, and the gradient in the second diagonal direction in the (n+2)×(n+2) matrix to obtain a second minimum gradient;
  determining, based on formula $$S_x = \frac{1}{n}\sqrt{\sum_{i=1}^{n}(Y_{xi} - \bar{Y}_x)^2},$$

in the n×n matrix and the (n+2)×(n+2) matrix: a standard deviation in a row direction, a standard deviation in a column direction, a standard deviation in a first diagonal direction, and a standard deviation in a second diagonal direction, where the grayscale parameter value corresponding to the sub-image unit to be processed resides, wherein S represents the standard deviation, x represents a direction, $Y_{xi}$ represents an i-th grayscale parameter value in the x direction, $\overline{Y}_x$ represents an average of grayscale parameter values in the x direction, n represents the number of gray scale parameter values in a row direction or in a column direction, $$\overline{Y}_x = \frac{\sum_{i=1}^{n} Y_{xi}}{n};$$

comparing the standard deviation in the row direction, the standard deviation in the column direction, the standard deviation in the first diagonal direction, and the standard deviation in the second diagonal direction in the n×n matrix to obtain a first minimum standard deviation, comparing the standard deviation in the row direction, the standard deviation in the column direction, the standard deviation in the first diagonal direction, and the standard deviation in the second diagonal direction in the (n+2)×(n+2) matrix to obtain a second minimum standard deviation.

3. The method for discriminating the boundary of image as claimed in claim 2, wherein determining respectively in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient comprises:

determining, based on formula $$Dif = \frac{1}{3}\sqrt{(H-A)^2 + (V-A)^2 + (LD-A)^2 + (RD-A)^2},$$

in the n×n matrix and the (n+2)×(n+2) matrix: dispersion of each of the standard deviation in the row direction, the standard deviation in the column direction, the standard deviation in the first diagonal direction, and the standard deviation in the second diagonal direction with respect to the minimum standard deviation; and dispersion of each of the gradient in the row direction, the gradient in the column direction, the gradient in the first diagonal direction, and the gradient in the second diagonal direction with respect to the minimum gradient, wherein when H, V, LD, RD respectively represent the gradient in the row direction, the gradient in the column direction, the gradient in the first diagonal direction, and the gradient in the second diagonal direction in the n×n matrix, A represents the first minimum gradient, Dif represents a first dispersion; when H, V, LD, RD respectively represent the standard deviation in the row direction, the standard deviation in the column direction, the standard deviation in the first diagonal direction, and the standard deviation in the second diagonal direction in the n×n matrix, A represents the first minimum standard deviation, Dif represents a second dispersion; when H, V, LD, RD respectively represent the gradient in the row direction, the gradient in the column direction, the gradient in the first diagonal direction, and the gradient in the second diagonal direction in the (n+2)×(n+2) matrix, A represents the second minimum gradient, Dif represents a third dispersion; when H, V, LD, RD respectively represent the standard deviation in the row direction, the standard deviation in the column direction, the standard deviation in the first diagonal direction, and the standard deviation in the second diagonal direction in the (n+2)×(n+2) matrix, A represents the second minimum standard deviation, Dif represents a fourth dispersion.

4. The method for discriminating the boundary of image as claimed in claim 3, wherein outputting a first code value when the determined dispersion is greater than N multiples of a minimum corresponding thereto, outputting a second code value when the determined dispersion is smaller than the N multiples of the minimum corresponding thereto, the minimum being the minimum standard deviation or the minimum gradient comprises:

if Dif>N×A, then outputting the first code value accordingly, if Dif<N×A, then outputting the second code value accordingly, N being a constant greater than 1; when Dif represents the first dispersion, A represents the first minimum gradient; when Dif represents the second dispersion, A represents the first minimum standard deviation; when Dif represents the third dispersion, A represents the second minimum gradient; when Dif represents the fourth dispersion, A represents the second minimum standard deviation.

5. The method for discriminating the boundary of image as claimed in claim 4, wherein N is a value ranging from 1.4 to 2.0.

6. The method for discriminating the boundary of image as claimed claim 5, wherein N is a value of 5/3.

7. The method for discriminating the boundary of image as claimed in claim 6, wherein the determining, based on an outputted code value, whether the image to be discriminated has a boundary and in which direction the boundary is comprises:

when the outputted code values to which the first dispersion, the second dispersion, the third dispersion, and the fourth dispersion correspond all are the second code value, determining that the image to be discriminated has no boundary;

when the outputted code values to which the first dispersion, the second dispersion, the third dispersion, and the fourth dispersion correspond all are the first code value, determining that the image to be discriminated has a boundary, and the boundary is in a direction to which smaller one of the second gradient and the second standard deviation corresponds;

when the outputted code values to which the first dispersion, the second dispersion, and the fourth dispersion correspond are the first code value, and the outputted code value to which the third dispersion corresponds is the second code value, determining that the image to be discriminated has a boundary, and the boundary is in a direction to which smaller one of the first gradient and the first standard deviation corresponds;

when the outputted code values to which the first dispersion, the second dispersion, and the third dispersion correspond are the first code value, and the outputted code value to which the fourth dispersion corresponds is the second code value, then determining that the image to be discriminated has a boundary, and the boundary is in a direction to which smaller one of the first gradient and the first standard deviation corresponds;

when the outputted code values to which the first dispersion and the second dispersion correspond are the first code value, and the outputted code values to which the third dispersion and the fourth dispersion correspond are the second code value, then determining that the image to be discriminated has a boundary, and the boundary is in a direction to which smaller one of the first gradient and the first standard deviation corresponds.

8. The method for discriminating the boundary of image as claimed claim 7, wherein the first code value is 1, the second code value is 0.

9. The method for discriminating the boundary of image as claimed in claim 5, wherein the determining, based on an outputted code value, whether the image to be discriminated has a boundary and in which direction the boundary is comprises:

when the outputted code values to which the first dispersion, the second dispersion, the third dispersion, and the fourth dispersion correspond all are the second code value, determining that the image to be discriminated has no boundary;

when the outputted code values to which the first dispersion, the second dispersion, the third dispersion, and the fourth dispersion correspond all are the first code value, determining that the image to be discriminated has a boundary, and the boundary is in a direction to which smaller one of the second gradient and the second standard deviation corresponds;

when the outputted code values to which the first dispersion, the second dispersion, and the fourth dispersion correspond are the first code value, and the outputted code value to which the third dispersion corresponds is the second code value, determining that the image to be discriminated has a boundary, and the boundary is in a direction to which smaller one of the first gradient and the first standard deviation corresponds;

when the outputted code values to which the first dispersion, the second dispersion, and the third dispersion correspond are the first code value, and the outputted code value to which the fourth dispersion corresponds is the second code value, then determining that the image to be discriminated has a boundary, and the boundary is in a direction to which smaller one of the first gradient and the first standard deviation corresponds;

when the outputted code values to which the first dispersion and the second dispersion correspond are the first code value, and the outputted code values to which the third dispersion and the fourth dispersion correspond are the second code value, then determining that the image to be discriminated has a boundary, and the boundary is in a direction to which smaller one of the first gradient and the first standard deviation corresponds.

10. The method for discriminating the boundary of image as claimed claim 9, wherein the first code value is 1, the second code value is 0.

11. The method for discriminating the boundary of image as claimed in claim 4, wherein the determining, based on an outputted code value, whether the image to be discriminated has a boundary and in which direction the boundary is comprises:

when the outputted code values to which the first dispersion, the second dispersion, the third dispersion, and the fourth dispersion correspond all are the second code value, determining that the image to be discriminated has no boundary;

when the outputted code values to which the first dispersion, the second dispersion, the third dispersion, and the fourth dispersion correspond all are the first code value, determining that the image to be discriminated has a boundary, and the boundary is in a direction to which smaller one of the second gradient and the second standard deviation corresponds;

when the outputted code values to which the first dispersion, the second dispersion, and the fourth dispersion correspond are the first code value, and the outputted code value to which the third dispersion corresponds is the second code value, determining that the image to be discriminated has a boundary, and the boundary is in a direction to which smaller one of the first gradient and the first standard deviation corresponds;

when the outputted code values to which the first dispersion, the second dispersion, and the third dispersion correspond are the first code value, and the outputted code value to which the fourth dispersion corresponds is the second code value, then determining that the image to be discriminated has a boundary, and the boundary is in a direction to which smaller one of the first gradient and the first standard deviation corresponds;

when the outputted code values to which the first dispersion and the second dispersion correspond are the first code value, and the outputted code values to which the third dispersion and the fourth dispersion correspond are the second code value, then determining that the image to be discriminated has a boundary, and the boundary is in a direction to which smaller one of the first gradient and the first standard deviation corresponds.

12. The method for discriminating the boundary of image as claimed claim 11, wherein the first code value is 1, the second code value is 0.

* * * * *